United States Patent [19]

Riesenberg

[11] Patent Number: 4,674,785
[45] Date of Patent: Jun. 23, 1987

[54] VACUUM LIFTING ARRANGEMENT

[75] Inventor: Manfred Riesenberg, Horn-Bad Meinberg, Fed. Rep. of Germany

[73] Assignee: Lewecke Maschinenbau GmbH, Blomberg, Fed. Rep. of Germany

[21] Appl. No.: 837,057

[22] Filed: Mar. 6, 1986

[30] Foreign Application Priority Data

Dec. 6, 1985 [DE] Fed. Rep. of Germany ....... 3543152

[51] Int. Cl.⁴ .......................... B66C 1/02; B25B 11/00
[52] U.S. Cl. .................................. 294/65; 294/64.1
[58] Field of Search .............................. 294/64.1, 65; 414/744 B, 752, 730, 737, 736; 269/21, 266, 297, 303

[56] References Cited

U.S. PATENT DOCUMENTS 3,865,359 2/1975 Caroli ..................................... 294/65
4,362,461 12/1982 Cathers ............................. 294/64.1

Primary Examiner—James B. Marbert
Attorney, Agent, or Firm—Erwin S. Teltscher

[57] ABSTRACT

A vacuum lifting arrangement for flat workpieces, such as lumber boards, lumber planks and the like includes a vertically and horizontally displaceable housing which forms a vacuum chamber, and an elastic sealing element arranged at the underside of the housing for conformingly contacting the workpiece and constituted either by a foamed material mat with suction apertures or by individual suction cups. The vacuum chamber is constructed as a vacuum accumulator and a valve plate is interposed between the housing and the sealing element. The interior of the valve plate is subdivided into a plurality of individual vacuum compartments each equipped with a valve and is connected with the vacuum chamber by a suction opening which can be selectively opened and closed. Each of the vacuum accumulator and the valve plate is provided with its own admission opening which communicates with the ambient atmosphere, such openings being openable and closable in unison. A high vacuum is built up in the vacuum accumulator and is supplied in the case of need through the individual vacuum compartments to the suction apertures or suction cups. The valves are automatically opened or closed in dependence on the configuration of the workpiece so that the suction portions of the sealing element which are fully covered by the workpiece are subjected to the full vacuum and the remaining suction portions are cut off from the vacuum by the action of the respective valves, thus avoiding vacuum loss and operation disruptions.

23 Claims, 5 Drawing Figures

I-I

II-II

VACUUM LIFTING ARRANGEMENT

BACKGROUND OF THE INVENTION

The present invention relates to vacuum lifting devices in general, and more particularly to a vacuum lifting arrangement for flat workpieces, such as lumber boards, lumber planks and the like.

There are already known various constructions of vacuum lifting arrangements of the above type, among them such which include a vertically and horizontally movable housing which forms a vacuum chamber, and an elastic sealing element arranged on the housing, operative for conformingly contacting the workpiece, and being constituted either by a foamed material mat provided with through suction apertures, or by individual suction cups.

Vacuum lifting arrangements of the above type have been developed in the course of the last 20 or 30 years and they are being further improved. Such lifting arrangements render it possible simultaneously (commonly) to lift a plurality of workpieces which are arranged adjacent to one another, regardless of whether or not free space (air) is present between the workpieces, whether or not the workpieces are cracked or otherwise damaged, whether or not workpieces are missing, and whether or not the workpieces have rough, cracked or soiled surfaces. Arrangements of this type can be used in manually operated installations just as well as in partially or fully motorized or automated applications. These arrangements are primarily being used for handling lumber elements, but they can also be utilized for handling elements of other materials. These arrangements have proven themselves to be particularly well suited for use in sawn lumber processing.

The basic principle of operation of an arrangement of this type involves the known physical phenomena of vacuum technology and of fluid dynamics. The basic construction of the lifting arrangements of this type is such that vacuum generating devices of different constructions can be connected thereto.

Experience with known arrangements of this type has shown, however, that they leave much to be desired in terms of simplicity of construction and also reliability of operation, since in many instances surface discontinuities in the workpieces to be lifted render the entire arrangement ineffective.

SUMMARY OF THE INVENTION

Accordingly, it is an object of the present invention to provide a vacuum lifting arrangement of the initially mentioned type which exhibits a simple and reliable vacuum buildup in the interior of the housing.

Another object of the present invention is to develop an arrangement of the type here under consideration which renders possible an automatic control of the application of vacuum to suction regions which either are or are not covered by the workpiece such as to maintain the full vacuum effect at such regions so long as the flow of ambient air through such regions does not exceed a predetermined threshold value.

Still another object of the present invention is so to construct the arrangement of the above type as to be relatively simple in construction, inexpensive to manufacture, easy to use, and reliable in operation nevertheless.

In keeping with these objects and others which will become apparent hereafter, one feature of the present invention resides in a vacuum lifting arrangement for flat workpieces, such as lumber boards, lumber planks and the like, which arrangement comprises a horizontally and vertically movable housing defining an enclosed internal vacuum accumulator space; a valve plate connected with the housing and having a major surface facing away from the housing, the valve plate including a plurality of individual compartments; a plurality of elastic vacuum applicator elements distributed over the major surface of the valve plate for engaging and sealing the respective workpiece in a conforming manner; communication means in the valve plate, including a plurality of branches each leading through one of the vacuum compartments for establishing communication between the vacuum accumulator space and that one of the vacuum applicator elements which is associated with the respective vacuum compartment; a number of individual valves mounted on the valve plate and each interposed in one of the branches for controlling the flow of ambient air through the respective branch into the vacuum accumulator space; means for selectively interrupting and establishing communication between the vacuum accumulator space and the communication means; first and second admitting means for respectively admitting ambient air into the vacuum accumulator space and into the interior of the valve plate to the communication means; and means for simultaneously selectively opening and closing the first and second admitting means.

In a particularly advantageous construction of the arrangement of the present invention, the means for bounding the chamber includes a hollow intermediate beam which has two end portions that are connected to the hollow frame and bound respective ends of the chamber that open into the internal channel of the hollow frame, the intermediate beam includes a top lid which is detachably connected to the remainder of the intermediate beam, and the housing includes a continuous bottom plate which is common to the hollow frame and to the hollow intermediate beam. Then a vacuum generating device is advantageously arranged on the bottom plate in one of two receiving spaces bounded by the hollow frame and the hollow intermediate beam. A vacuum port of the vacuum generating device is connected by a connection pipe with the internal chamber of the intermediate beam. A suction opening is provided in the bottom plate at the region of the intermediate beam. The suction opening can be selectively opened and closed by a pivotably mounted flap.

One pipe section extends from a communication opening provided in the bottom plate, and another pipe section extends from another communication opening provided in the hollow frame, into the other of the two receiving spaces. These pipe sections have respective free open ends which can be simultaneously opened and closed by an additional flap which is pivotably mounted in the other receiving space. The displacement of the flaps between their open and closed positions is accomplished by means of respective actuating devices which can be constructed as cylinder-and-piston units operated by a pressurized fluid, as linear motors, as lifting magnet units, and the like.

It will be appreciated that, in the lifting arrangement of the above-discussed construction, the vacuum which is generated in the vacuum generating device propagates into the vacuum accumulator space which is formed by the metallic housing. A valve chamber including a plurality of individual compartments and a plurality of valves each of which is associated with one of the compartments is arranged at the underside of the housing. A number of individual suction cups which may have various configurations and dimensions or a foamed material mat provided with a multitude of suction apertures is arranged at the bottom major surface of the valve plate. Thus, individual suction regions are formed by the valves and the individual suction cups or the suction apertures and the portions of the mat which surround such suction apertures. These adjacent suction regions are distributed at respective distances from one another in such a manner that the corresponding workpieces can be lifted by the lifting arrangement.

Each of the vacuum compartments has associated therewith its own valve, which can be constituted by a ball valve, a poppet valve or a tappet valve. The valve is so constructed that it automatically closes when the rate of low of the ambient air therethrough reaches a predetermined, defined value, so as to assure that the full basic vacuum is preserved and that the suction regions which remain active retain their full carrying force. Jet nozzles can, however, be used instead of the valves, provided that the jet nozzles are so constructed and configurated as to achieve the same effect.

The vacuum accumulator arrangement is provided, in dependence on the needed carrying force, with more suction regions (compartments) than necessary, so as to assure that, after the closing of some of the valves, a sufficient number of the valves remains open and, as a result thereof, the requisite suction and carrying force is available in all cases.

The distribution of the suction regions (suction apertures or individual suction cups) depends on the output of the vacuum generating device, the dimensions of the workpieces, the surface quality of the workpieces and the conditions of the workpieces (curvatures, distortions or the like).

A high vacuum is built up in the metallic housing due to the provision of the vacuum accumulator and of the central suction opening, as well as of the two communication openings which communicate with the ambient atmosphere. This high vacuum is then made available as needed to the valve plate whose individual compartments are then automatically controlled by the valves in dependence on the properties of the workpieces such that the suction regions which are fully covered by the workpieces retain their full basic vacuum while the other regions are automatically closed by the corresponding valves, so that no vacuum loss and disturbance in the operation of the arrangement are encountered.

BRIEF DESCRIPTION OF THE DRAWING

An exemplary embodiment of the present invention will be discussed below in more detail with reference to the accompanying drawing in which.

DETAILED DESCRIPTION OF THE PREFERRED EMBODIMENTS

Figure 1:
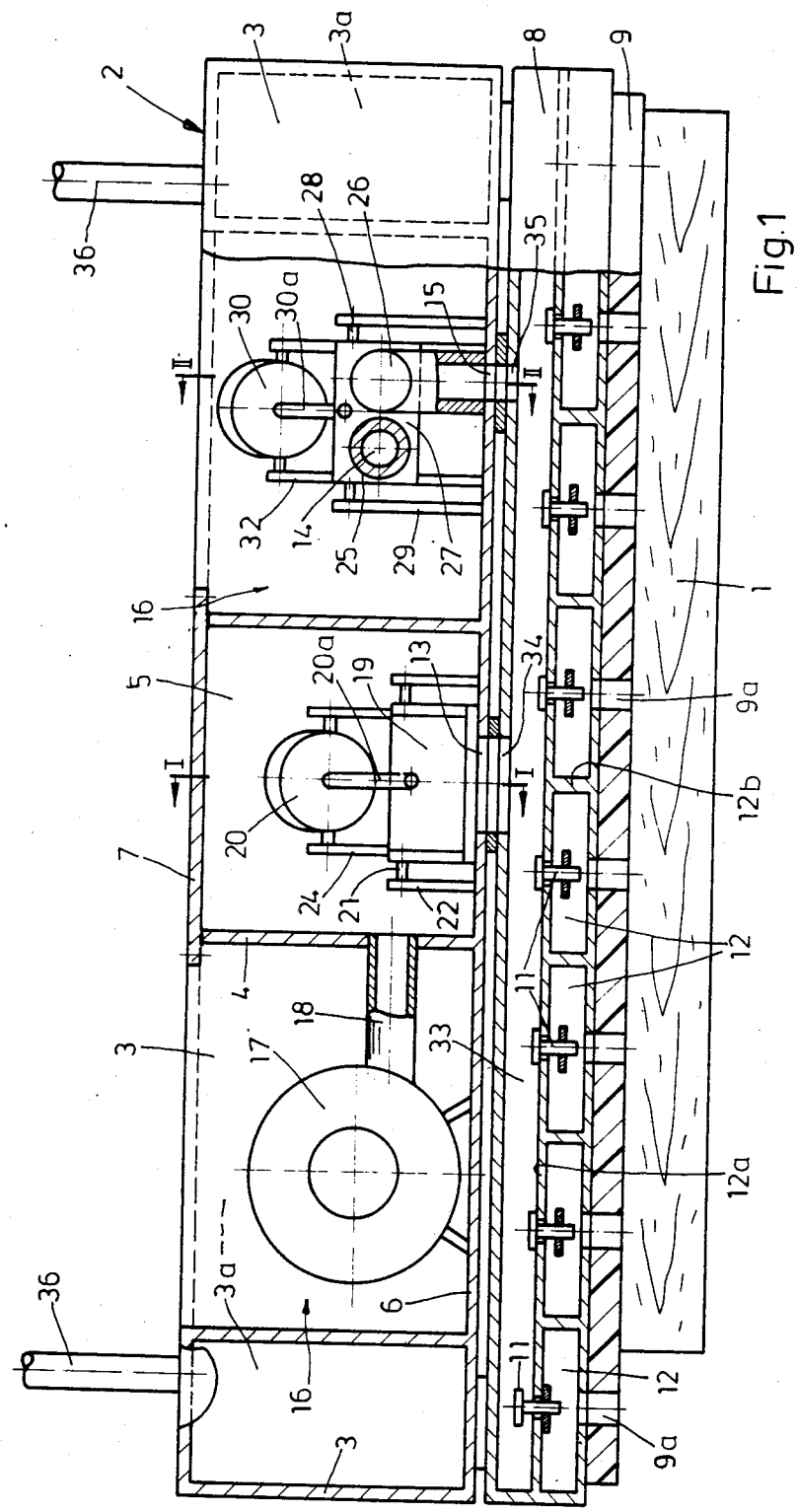
FIG. 1 is a vertical sectional view through a vacuum lifting arrangement of the present invention.

Referring now to the drawing, there will be seen a vacuum lifting arrangement according to the present invention for lifting, transporting and lowering flat workpieces 1, such as lumber boards, lumber planks or the like. This vacuum lifting arrangement includes a frame-like housing 2 which is constructed as a vacuum accumulator. The frame-like housing 2 has, in an advantageous manner, a polygonal, such as a rectangular, basic outline. The housing 2 is constituted by an outer circumferentially extending hollow frame 3 which is closed on all sides, and by a hollow intermediate beam 4 which bounds a chamber 5 that is in communication with an internal enclosed channel 3a of the hollow frame 3.

Figure 2:
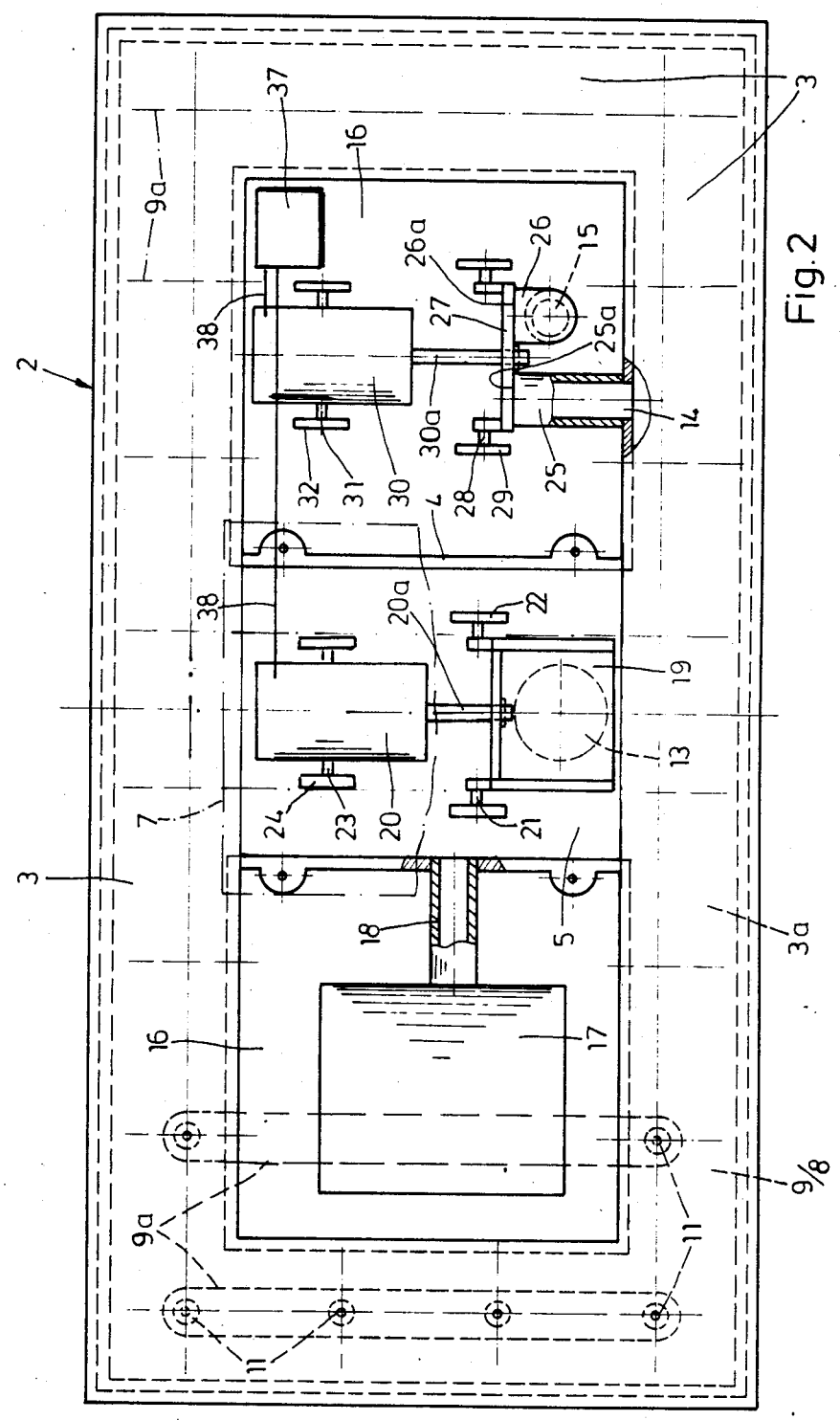
FIG. 2 is a top plan view of the arrangement of FIG. 1.

This hollow frame 3 and the hollow intermediate beam 4 with their respective internal channel 3a and chamber 5 form a unitary vacuum accumulator. Both the circumferentially extending hollow frame 3 and the hollow intermediate beam 4 have a polygonal, preferably rectangular cross section. In the disclosed construction, the hollow frame 3 is closed at all sides and is provided at its lower or bottom side with a continuous bottom plate 6 which also closes the intermediate beam 4 at its lower or bottom side. As shown in FIG. 1, the intermediate beam 4 is closed at its upper side by a dismountable lid 7 which has been removed in FIG. 2.

Figure 5:
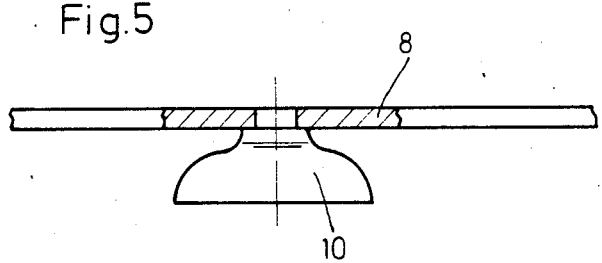
FIG. 5 is a significantly enlarged partially sectioned side elevational view of a region of FIG. 1 which is provided with a suction cup.

A valve plate 8 is mounted underneath the bottom plate 6. The valve plate 8 secures a sealing component in position underneath the valve plate 8. This sealing component is constituted either by a foamed material mat 9 provided with a plurality of suction apertures 9a as shown in FIG. 1, or by a plurality of individual suction cups 10 one of which is depicted in FIG. 5. The foamed material mat 9 consists of foamed rubber, foamed synthetic plastic material or the like. The sealing component 9 or 10 is so designed as to be elastic, so that it is able to conformingly engage the workpieces 1 to be lifted. The zones of the foamed material mat which surround the respective suction apertures or the individual cups 10 constitute respective vacuum applicator elements.

The valve plate 8 is subdivided, correspondingly to the distribution of the suction apertures 9a or of the individual suction cups 10, into individual compartments 12 each of which contains a valve 11. These individual compartments 12 are connected via a central suction opening 13, which can selectively be opened or closed, with the internal space 3a and 5 of the vacuum accumulator. Each of the vacuum accumulator space 3a and 5 and the interior of the valve plate 8 is connected with its own respective first or second communication opening 14 or 15 which communicates with the ambient atmosphere. However, the first and second communication openings 14 and 15 can be opened and closed in unison.

The hollow frame 3 and the hollow intermediate beam 4 also form two receiving spaces 16 which are closed in the downward direction by the bottom plate 6 and open in the upward direction. A vacuum generating device 17 is received in one of the receiving spaces 16 and is secured in position on the bottom plate 6. The vacuum generating device 17 is in communication with the chamber 5 through a tubular suction conduit 18. The suction conduit 18 preferably opens onto the internal surface of one of the side walls bounding the chamber 5. In this manner, a vacuum can be built up in the vacuum accumulator space 3a and 5 by the vacuum generating device 17 through the suction conduit 18.

The suction opening 13 extends into the chamber 5 and is constituted in the illustrated construction by a recess in the bottom plate 6. The suction opening 13 can be opened and closed by a flap 19 which is pivotably mounted in the chamber 5. The pivotal movement of the flap 19 between its closing and fully open positions is accomplished by means of an actuating device 20 which is also accommodated in the chamber 5 and can be of any known construction, such as a cylinder-and-piston unit operated by a pressurized fluid, a linear motor, a lifting magnet unit or the like.

Figure 3:
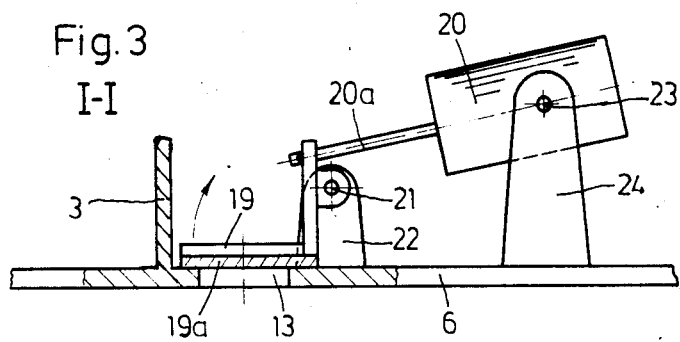
FIG. 3 is a sectional view taken along the line I—I of FIG. 1 and showing a suction opening and an opening and closing device associated therewith.

As shown in FIG. 3 of the drawing, the flap 19 is provided with a sealing element 19a. In the closing position of the flap 19, the sealing element 19a covers and extends outwardly beyond the suction opening 13. The flap 19 is mounted on a bearing block 22 for pivoting about an axle 21, the axle 21 being so situated that the pivoting of the flap 19 is accompanied by raising or lowering of the flap 19. The actuating device 20 is mounted on a bearing block 24 also for pivoting about a horizontal axle 23 with attendant elevational change and includes an output rod 20a which engages the flap 19.

Figure 4:
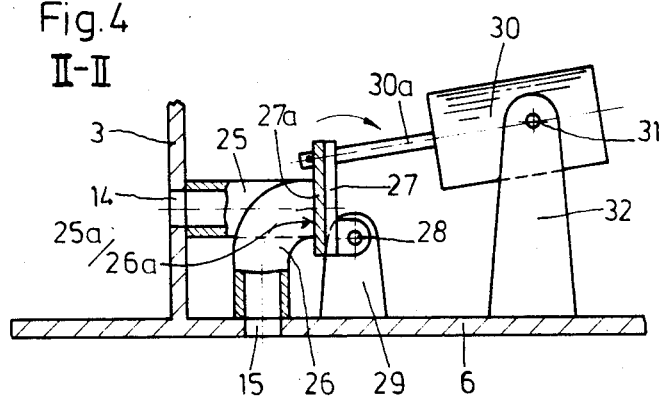
FIG. 4 is a sectional view taken along the line II—II of FIG. 1 and showing atmosphere openings and an opening and closing device associated therewith.

In the other receiving space 16, there is provided the aforementioned second communication opening 15 in the bottom plate 6 and the first communication opening 14 in a side wall of the hollow frame 3. A respective connection pipe 25 or 26 extends from the associated one of the communication openings 14 and 15 into the other receiving space 16. The connection pipes 25 and 26 have respective open ends 25a and 26a which are situated next to one another and are aligned with one another along a common plane. The open ends 25a and 26a can be closed and opened by a flap 27 which is pivotably mounted in the other receiving space 16. This flap 27 is also provided with a sealing element 27a which engages the connection pipes 25 and 26 at their open ends 25a and 26a in the closing position of the flap 27 to sealingly close the open ends 25a and 26a. The flap 27 is supported on a bearing block 29 for pivoting about a horizontally extending axle 28. An actuating device 30, such as a cylinder-and-piston unit operated by a pressurized fluid, a linear motor, a lifting magnet unit or the like, is provided for the pivoting of the flap 27. The actuating device 30 is mounted for pivoting about a horizontal axle 31 on a bearing block 32 situated in the other receiving space 16 and includes an operating rod 30a which engages the flap 27, as seen particularly in FIG. 4.

The individual compartments 12 in the valve plate 8 are defined by a horizontal partitioning wall 12a and by vertical partitioning webs 12b. A continuous suction chamber 33 extends above the individual compartments 12. The suction opening 13 and the second communication opening 15 to the ambient atmosphere open into this continuous suction chamber 33. The connection of the openings 13 or 15 with the suction chamber 33 is achieved by respective connecting openings 34 or 35 which are provided in the upper side of the valve plate 8.

Poppet or disk valves, tappet valves, ball valves or jet orifices can be used as the valves 11 which either establish or interrupt communication between the individual compartments 12 and the suction chamber 33.

The sealing element 9 which is constituted by the aforementioned foamed material mat is shown to be provided at the lower major surface of the valve plate 8 in such a manner as to be continuous and extend over the entire lower major surface of the valve plate 8. However, the sealing element 9 could also be subdivided into separate individual portions. The suction apertures 9a are formed by a plurality of slots, holes or the like which extend at respective spacings from one another through the sealing element 9.

FIG. 5 of the drawings shows the connection of a single one of the individual suction cups 10 to the valve plate 8. When the individual suction cups 10 are being used, a plurality of such individual suction cups 10 is secured in position on the valve plate 8 as well. The reference numeral 36 which may be found in FIG. 1 of the drawing identifies vertical guides for vertical movement and other displacement of the entire lifting arrangement.

The operation of the above-described lifting arrangement is as follows: when the suction opening 13 is closed by the flap 19 and the first and second communication openings 14 and 15 with the ambient atmosphere are opened by the flap 27, then the vacuum generating device 17 which is constituted by a blower can be switched on (run), but no vacuum builds up in the vacuum accumulator space 3a and 5 since this vacuum accumulator space 3a and 5 is connected with the ambient atmosphere through the communication openings 14 and 15.

On the other hand, when the suction opening 13 is closed by the flap 19 and also the first and second communication openings 14 and 15 with the ambient atmosphere are closed by the flap 27, then vacuum is produced by the vacuum generating device 17 throughout the vacuum accumulator space 3a and 5.

Now, when the suction opening 13 is opened by the flap 19 and the first and second communication openings 14 and 15 with the ambient atmosphere continue to be closed by the flap 27, in that the sealing element 27a of the flap 27 is in sealing contact with the connection pipes 25 and 26 at their open ends 25a and 26a, then vacuum is generated even in the suction chamber 33 and a suction force is produced through the valves 11 in the individual compartments 12. Then, the valves 11 remain in their open positions at the regions of the suction apertures 9a or of the individual suction cups 10 at which the workpiece 1 is present and a suction effect is applied to the workpiece 1 at such regions so that the workpiece 1 can be lifted.

On the other hand, at the regions of the suction apertures 9a or of the individual suction cups 10 from which the workpiece 1 is absent or at which the workpiece 1 exhibits cracks or other discontinuities, the valves 11 are moved by the suction action upwardly into their closed positions, so that the suction chamber 33 is closed at these regions and no further suction force is exerted in the corresponding affected individual compartments 12.

The leftmost valve 11 is shown in FIG. 1 of the drawing in its upwardly displaced closed position, inasmuch as no portion of the workpiece 1 is situated below the suction aperture 9a which is associated with this closed valve 11 and the associated individual compartment 12. All other valves 11 shown in FIG. 1 are in their downwardly displaced open positions since their associated suction apertures 9a are covered by the workpiece 1.

In basic principle, this means that, when the flow=0, then the valves 11 are in their lower open positions and the vacuum is effective. On the other hand, when the flow=X, where X represents a predetermined rate of flow, then the valves 11 assume their upper closed positions and no vacuum is effective. Flow=0 means that the workpiece 1 is present at the region of the suction apertures 9a or of the individual suction cups 10 and no crack or other deformity is present in the workpiece 1 at this region. Flow=X means either that no workpiece 1 is present at the region of the suction apertures 9a or of the individual suction cups 10, or that a crack is present in the workpiece 1 at this region.

In the case of a total pressure equalization, the valves 11 fall downwardly due to their own weights and again permit the suction force to become effective.

For the release of the workpiece 1, the flap 27 is pivoted into its opening position so that, as a result of this pivotal displacement of the flap 27, the first and second communication openings 14 and 15 receive ambient air at atmospheric pressure and, consequently, the vacuum is eliminated. At this time, the flap 19 may still remain in its open position; however, it is subsequently pivoted again into its closing position for the generation of vacuum.

The reference numeral 37 has been used to identify an electrical and/or electronic switching and control unit which is arranged in one of the receiving spaces 16. The unit 37 is connected by respective electrically conductive lines or wires 38 with the actuating arrangements 20 and 30 for controlling the operation of the actuating arrangements 20 and 30 in dependence on the operating conditions and requirements.

At least one valve 11 is associated in the valve plate 8 with each of the individual compartments 12. Furthermore, one valve 11 is associated with each of the individual suction cups 10 and with each of the suction apertures 9a if such suction aperture 9a is hole-shaped, while either one or more of the valves 11 may be associated with each of the suction apertures 9a if such suction aperture 9a is slot-shaped. The control of the movements of the valves 11 into their open and closed positions by the vacuum or by the atmospheric flow is automatically determined by the presence or the absence of the workpiece 1 or of a workpiece crack or other irregularity at the region of the respective suction aperture 9a or of each individual suction cup 10.

Further details of the invention will become apparent from the accompanying claims. However, it is to be understood that the subject matter of the present invention is not limited to the features of the individual claims; rather, it also resides in the combination of such features.

What is claimed is:

1. A vacuum lifting arrangement for flat workpieces, such as lumber boards, lumber planks and the like, comprising a horizontally and vertically movable housing defining an enclosed internal vacuum accumulator space;
   a valve plate connected with said housing and having a major surface facing away from said housing, said valve plate including a plurality of individual compartments;
   a plurality of elastic vacuum applicator elements distributed over said major surface of said valve plate for engaging and sealing the respective workpiece in a conforming manner;
   communication means in said valve plate, including a plurality of branches each leading through one of said vacuum compartments for establishing communication between said vacuum accumulator space and that one of said vacuum applicator elements which is associated with the respective vacuum compartment;
   a number of individual valves mounted on said valve plate and each interposed in one of said branches for controlling the flow of ambient air through the respective branch into said vacuum accumulator space;
   means for selectively interrupting and establishing communication between said vacuum accumulator space and said communication means;
   first and second admitting means for respectively admitting ambient air into vacuum accumulator space and into the interior of said valve plate to said communication means;
   means for simultaneously selectively opening and closing said first and second admitting means;
   wherein said housing includes a hollow frame which completely encloses an internal channel and means for bounding a completely enclosed chamber which communicates with said channel to form said vacuum accumulator space therewith;
   wherein said communication means include a suction opening which opens into said chamber; and
   vacuum generating means and connecting conduit means for connecting said vacuum generating means with said chamber;
   wherein said means for bounding said chamber includes a hollow intermediate beam which has two end portions that are connected to said hollow frame and bound respective ends of said chamber that open into said internal channel of said hollow frame;
   wherein said intermediate beam includes a top lid which is detachably connected to the remainder of said intermediate beam; and
   wherein said housing includes a continuous bottom plate which is common to said hollow frame and to said hollow intermediate beam.

2. The arrangement as defined in claim 1, wherein said vacuum applicator elements are constituted by separate suction cups.

3. The arrangement as defined in claim 2, wherein one of said valves is associated with each of said individual vacuum compartments and each of said suction cups.

4. The arrangement as defined in claim 2, wherein said suction opening is provided in said bottom plate of said housing which faces said valve plate; and wherein said communication means includes a connecting opening in said valve plate through which said suction opening communicates with the interior of said valve plate.

5. The arrangement as defined in claim 4, wherein said means for selectively interrupting and establishing communication includes a flap mounted in said chamber for pivoting between its closed position in which it closes said suction opening and its open position in which it is spaced from said suction opening, and an actuating device arranged in said chamber, connected to said flap and operative for pivoting said flap between said closed and open positions.

6. The arrangement as defined in claim 5, wherein said actuating device is a cylinder-and-piston unit operated by a pressurized fluid.

7. The arrangement as defined in claim 5, wherein said actuating device is a linear motor.

8. The arrangement as defined in claim 5, wherein said actuating device is a lifting magnet unit.

9. The arrangement as defined in claim 5, wherein said hollow frame and said intermediate beam together bound two receiving spaces which are closed in the downward direction by said bottom plate and are open in the upward direction, one of said receiving spaces receiving said vacuum generating means; and wherein said connecting conduit means includes a connecting pipe which extends from said vacuum generating means through said one receiving space to said intermediate beam and is connected to said intermediate beam.

10. The arrangement as defined in claim 9, wherein said connecting pipe is connected to one of the side walls of said intermediate beam.

11. The arrangement as defined in claim 9, wherein said vacuum generating means includes a suction blower.

12. The arrangement as defined in claim 9, wherein said first and second admitting means includes respectively a first opening in said bottom plate and a second opening in a side wall of said intermediate beam in the other of said receiving spaces, and respective first and second pipe sections extending from said first and second openings into said other receiving space and having respective free ends which are arranged next to each other and in alignment along a common plane with one another; and wherein said means for simultaneously selectively opening and closing includes a common flap mounted in said other receiving space for pivoting between its open position and its closed position in which it simultaneously closes both of said free ends, and an additional actuating device connected to said common flap and operative for pivoting said common flap between said open and closed positions.

13. The arrangement as defined in claim 12, wherein said additional actuating device is a cylinder-and-piston unit operated by a pressurized fluid.

14. The arrangement as defined in claim 12, wherein said additional actuating device is a linear motor.

15. The arrangement as defined in claim 12, wherein said additional actuating device is a lifting magnet unit.

16. The arrangement as defined in claim 12, wherein said valve plate includes a suction chamber which extends over all of said vacuum compartments and forms a part of said communicating means; wherein said vacuum compartments are separated from said suction chamber by a partitioning wall and from one another by partitioning webs; wherein said suction opening and said first opening communicate with said suction chamber; and wherein said valves are interposed between said suction chamber and said individual vacuum compartments to establish and interrupt communication between said suction chamber and said individual vacuum compartment.

17. The arrangement as defined in claim 16, wherein said valves are constructed as poppet valves.

18. The arrangement as defined in claim 16, wherein said valves are constructed as tappet valves.

19. The arrangement as defined in claim 16, wherein said valves are constructed as ball valves.

20. The arrangement as defined in claim 16, wherein said valves are constructed as jet nozzles.

21. The arrangement as defined in claim 1, wherein said vacuum applicator elements are constituted by portions of a foamed material mat, each of said portions having a through suction aperture which communicates with the respective branch of said communication means.

22. The arrangement as defined in claim 21, wherein said suction apertures have hole-shaped configurations; and wherein one of said valves is associated with each of said individual vacuum compartments and each of said suction apertures.

23. The arrangement as defined in claim 21, wherein said suction apertures have slot-shaped configurations; and wherein one of said valves is associated with each of said individual vacuum compartments and at least one of said valves is associated with each of said suction apertures.

* * * * *